United States Patent [19]
Kimura et al.

[11] Patent Number: 5,410,482
[45] Date of Patent: Apr. 25, 1995

[54] APPARATUS FOR ESTIMATING VIBRATION INPUT TO A SUSPENSION DEVICE

[75] Inventors: Takeshi Kimura, Yokohama; Hideo Tobata; Kensuke Fukuyama, both of Yokosuka; Yosuke Akatsu, Yokohama, all of Japan

[73] Assignee: Nissan Motor Co., Ltd., Yokohama, Japan

[21] Appl. No.: 62,841

[22] Filed: May 17, 1993

[30] Foreign Application Priority Data

May 15, 1992 [JP] Japan .................. 4-148716

[51] Int. Cl.$^6$ ............................ B60G 17/015
[52] U.S. Cl. .................. 364/424.05; 280/707; 280/840
[58] Field of Search .............. 364/424.05; 280/707, 280/840

[56] References Cited

U.S. PATENT DOCUMENTS

| | | | |
|---|---|---|---|
| 4,579,366 | 4/1986 | Doi et al. | 280/707 |
| 4,700,971 | 10/1987 | Doi et al. | 364/424.05 |
| 5,071,159 | 12/1991 | Kamimura et al. | 280/707 |
| 5,255,191 | 10/1993 | Fulks | 280/707 |
| 5,322,320 | 6/1994 | Sahashi | 280/707 |

FOREIGN PATENT DOCUMENTS 61-135811 6/1986 Japan .
61-166715 7/1986 Japan .
64-74111 3/1989 Japan .

Primary Examiner—Gary Chin
Attorney, Agent, or Firm—Foley & Lardner

[57] ABSTRACT

An apparatus for estimating vibration input to be transferred from a road surface to a suspension device of a vehicle. The apparatus converts stroke displacement values ($S_{FL}$, $S_{FR}$) detected by stroke sensor (27FL, 27FR) arranged on locations near the front wheels into stroke speed values ($S_{VFL}$, $S_{VFR}$) by differentiating circuits (41a, 41b) including a high-pass filer whose cutoff frequency ($f_{HC}$) is set at substantially twice the spring-bottom resonance frequency (20 Hz, for example). The apparatus further converts body work vertical acceleration values ($Z_{GFL}$, $Z_{GFR}$) detected by vertical acceleration sensors (28FL, 28FR) arranged on locations near the front wheels into spring-top speed values ($Z_{VFL}$, $Z_{VFR}$) by integrating circuits (41c, 41d) including a low-pass filter whose cutoff frequency ($f_{LC}$) is set at nearly one sixth of the spring-top resonance frequency (0.2 Hz, for example). The apparatus adds these speed values to each other by adders (41e, 41f) to provide differential values ($x_{OFL}'$, $x_{OFR}'$) of the spring-bottom displacement values obtained by accurately estimating the vibration input from a road surface by cancelling the spring-top speeds with each other.

4 Claims, 12 Drawing Sheets

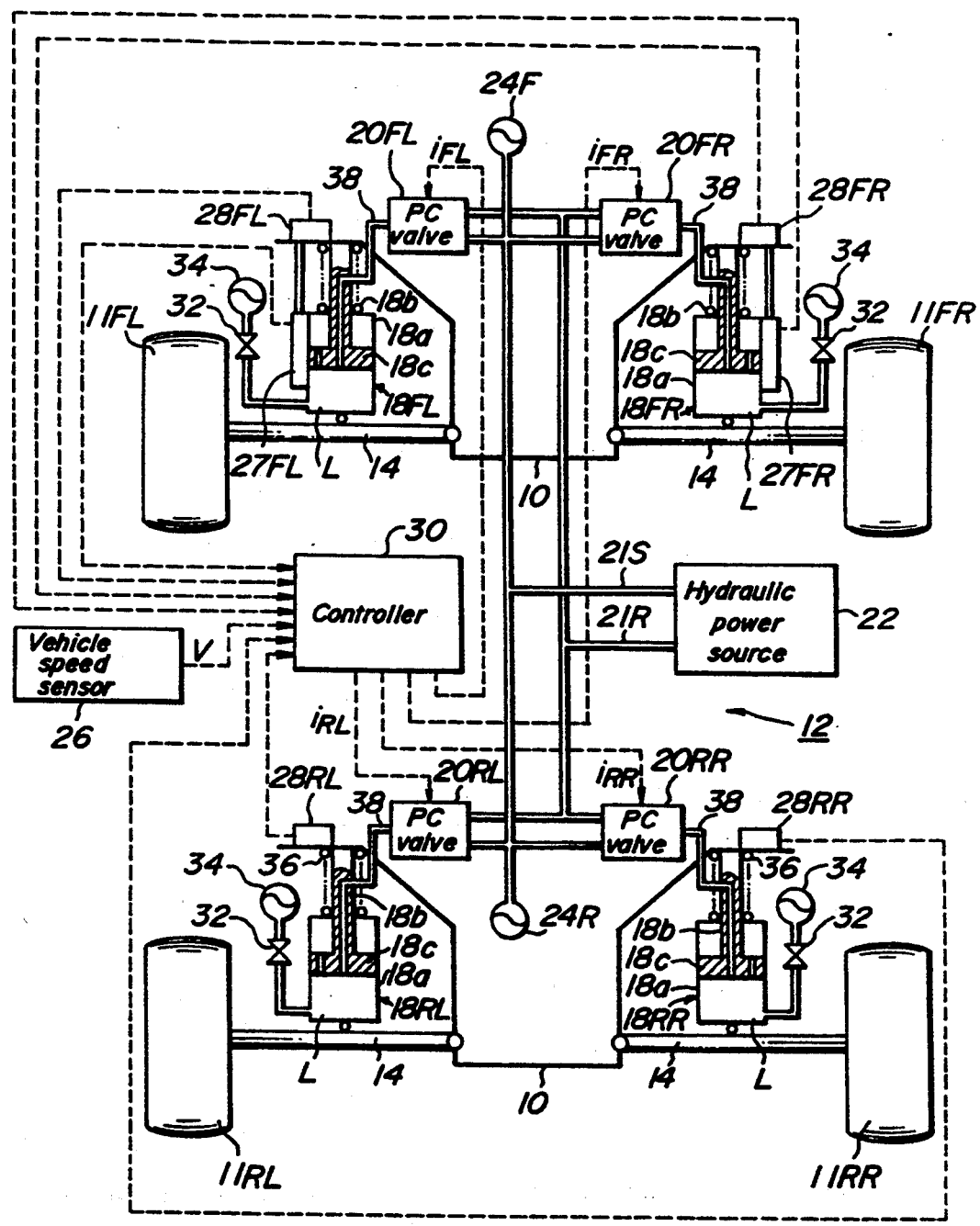
FIG_1

FIG_2
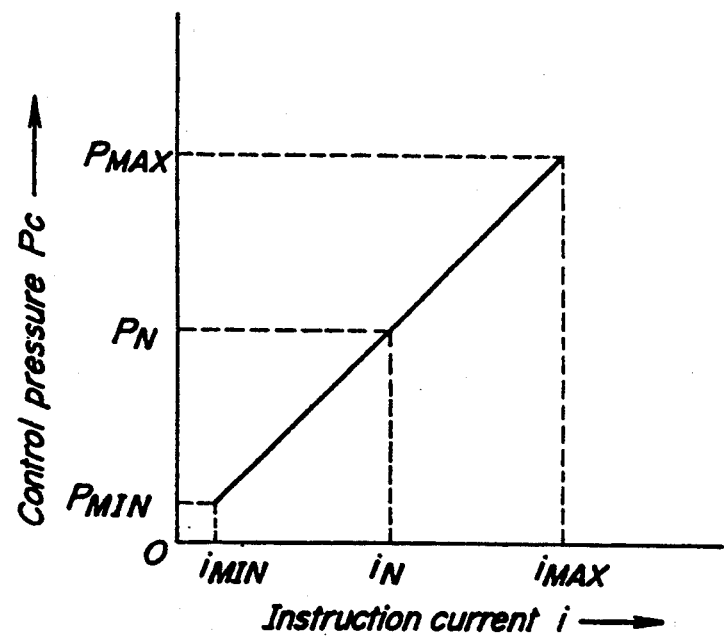
FIG_3
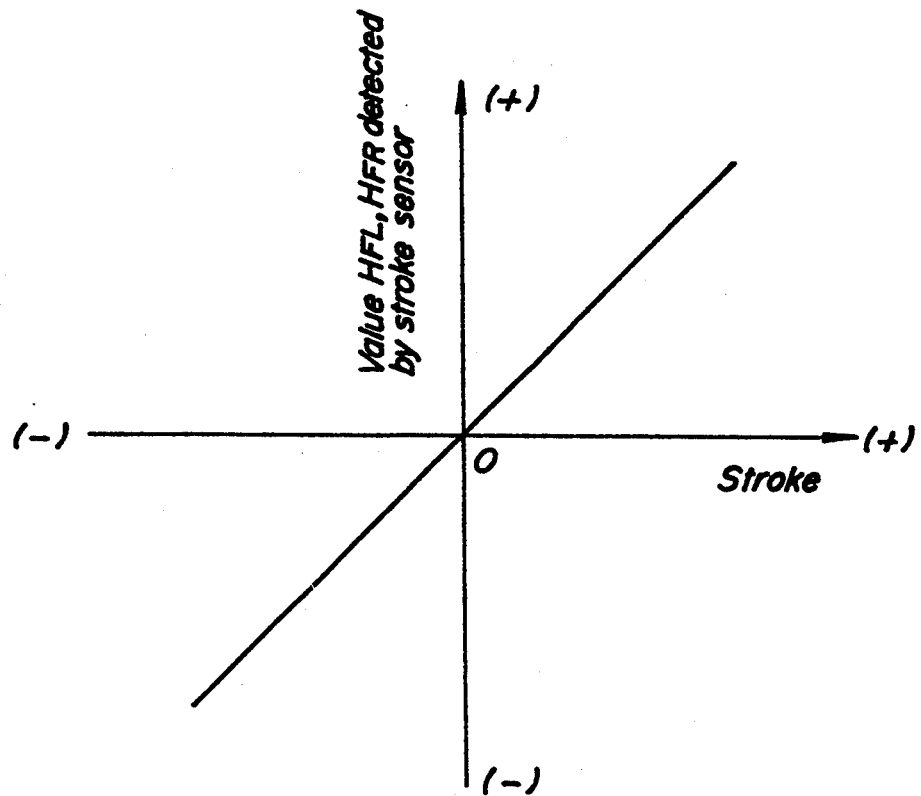

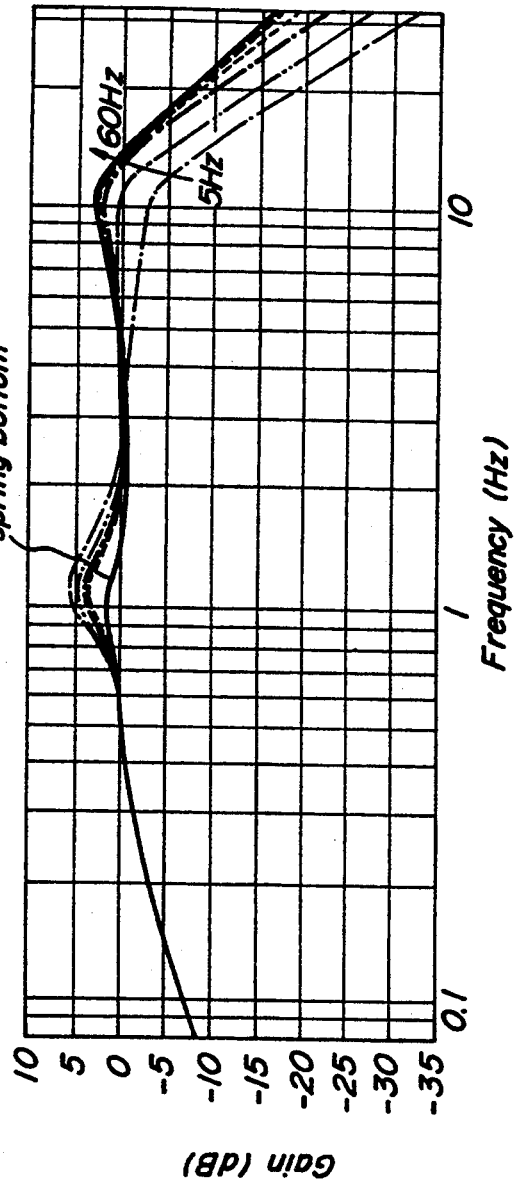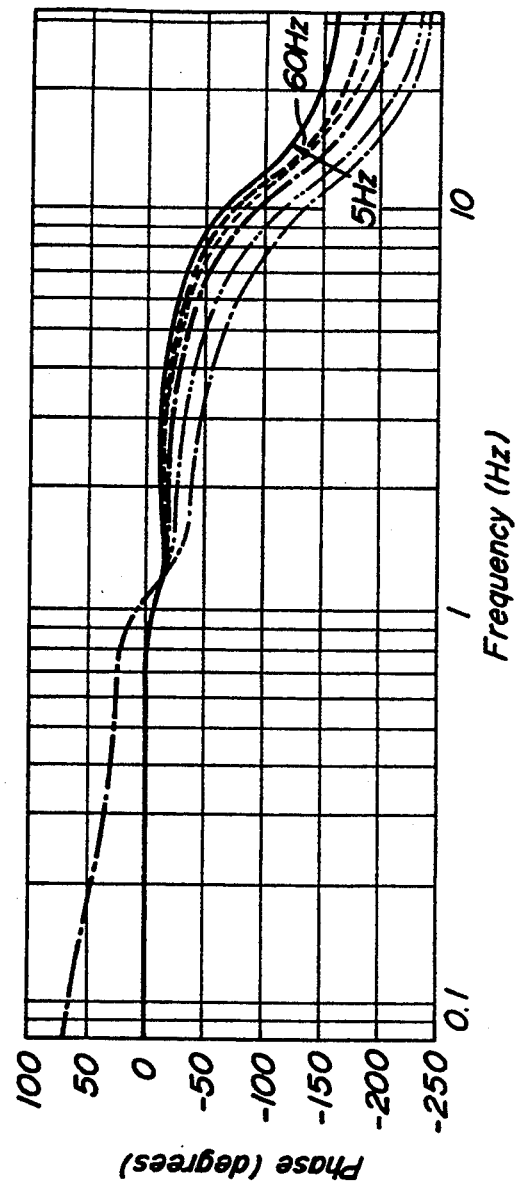
FIG._7A
FIG._7B

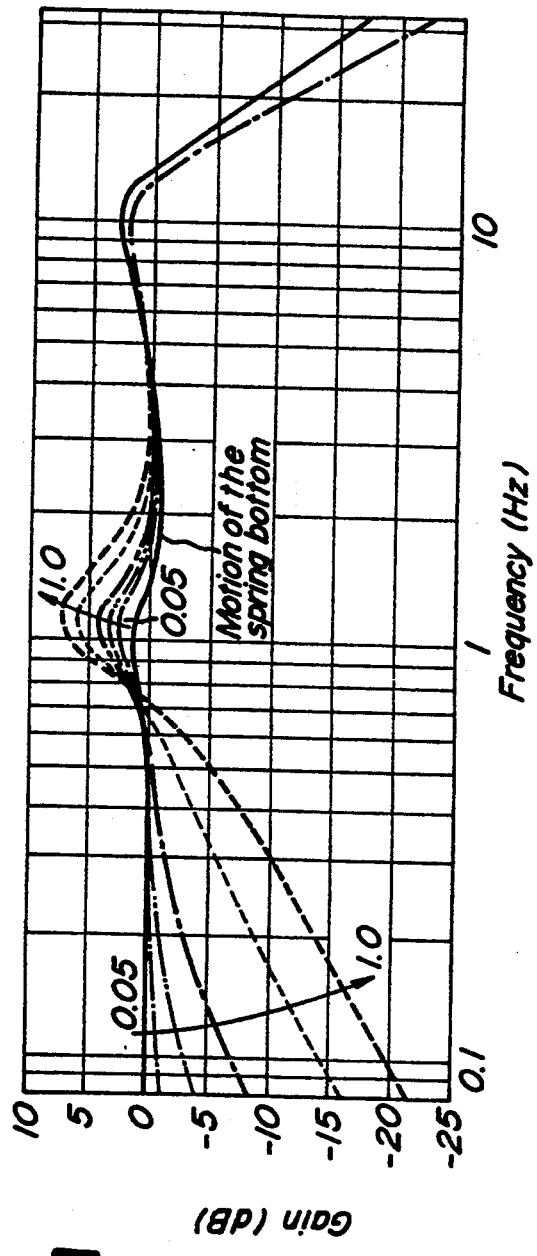
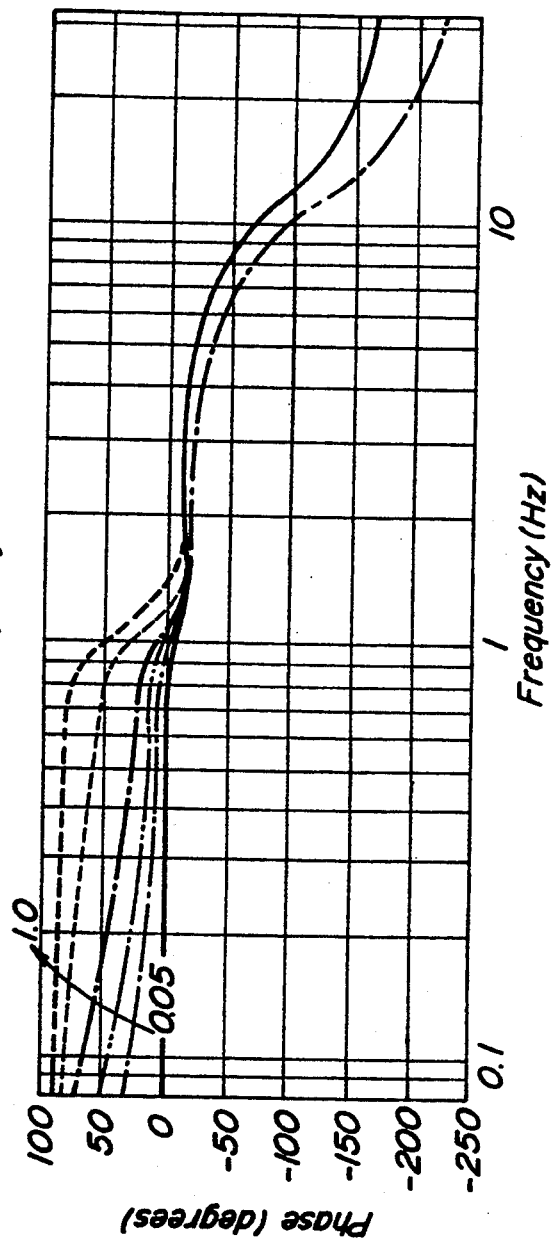
FIG._9A
FIG._9B

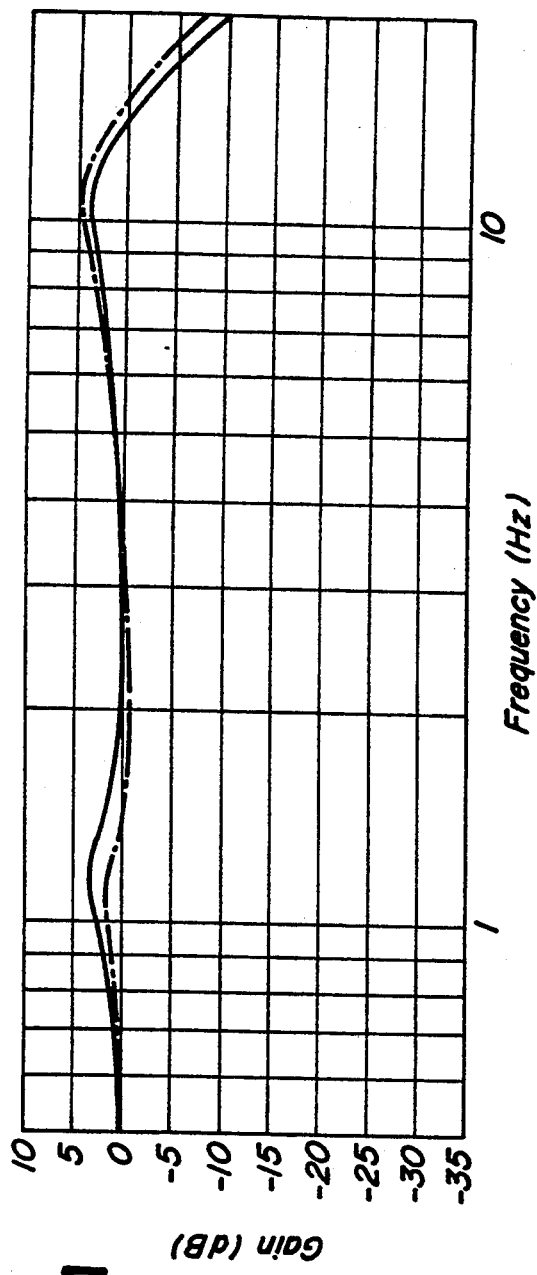
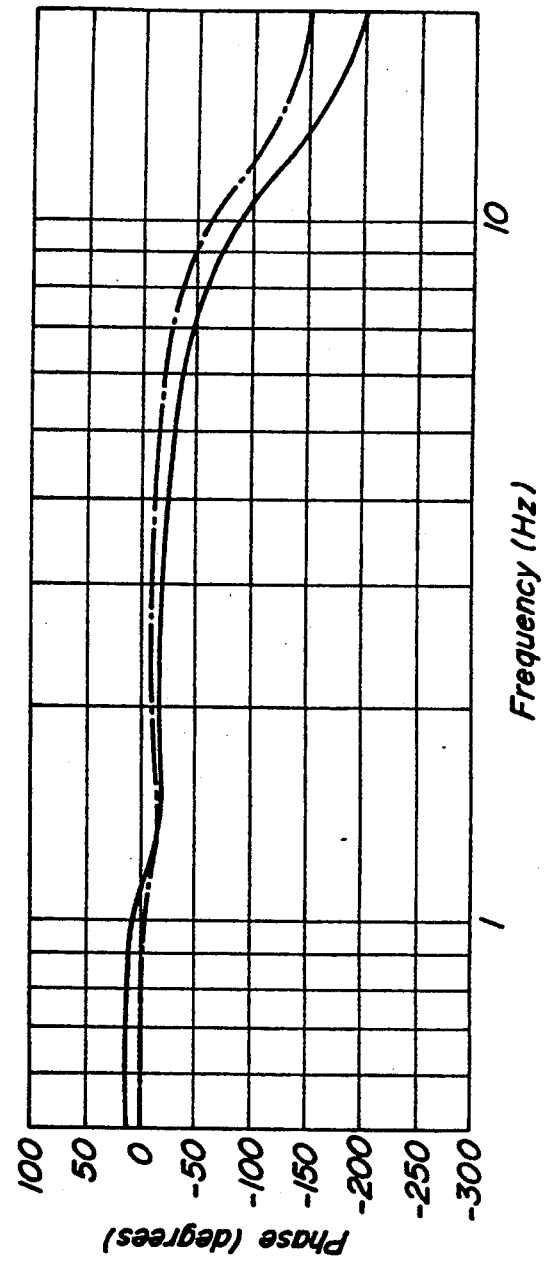
FIG._12A
FIG._12B

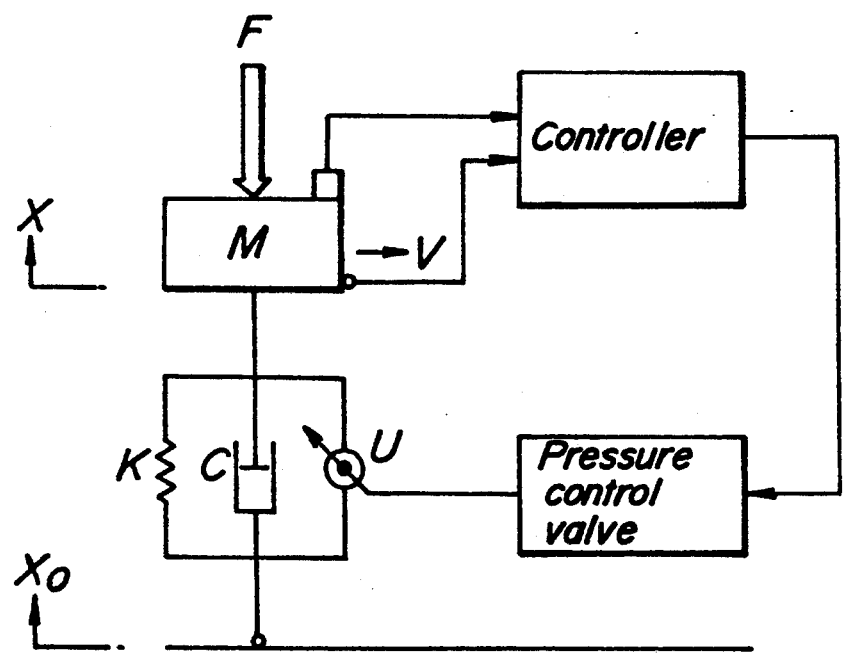
FIG_13

APPARATUS FOR ESTIMATING VIBRATION INPUT TO A SUSPENSION DEVICE

BACKGROUND OF THE INVENTION

1. Field of the Invention

The present invention relates to an apparatus for estimating vibration input to a suspension device of a vehicle.

More particularly, the invention pertains to an apparatus for estimating a vibration input to be transferred to the suspension device from a road surface, which is suitable for a suspension control system adapted to perform a predict control of an actuator which is arranged between a wheel to be controlled and the body work of the vehicle, on the basis of a road surface information detected on the front side of the wheel to be controlled.

2. Description of the Prior Art

An apparatus for estimating a vibration input to a suspension device is disclosed, e.g., in JP-A-61-166715, wherein an acceleration sensor is arranged on a suspension arm of a front wheel, for detecting a vertical acceleration generated by a front wheel motion in a direction perpendicular to a road surface, and changing the suspension characteristic of a rear wheel on the basis of the vertical acceleration value. However, since the acceleration sensor for detecting the vertical acceleration is arranged on the suspension arm, it is difficult to implement the apparatus in effect due to insufficient durability and weatherproofness of the sensor itself. Furthermore, it is also difficult to accurately detect the vertical acceleration of the wheel alone, due to a vertical motion of the body work which is transferred to the suspension device.

Another type of apparatus for estimating a vibration input to a suspension device is disclosed, e.g., in JP-A-61-135811, which is combined with a shock absorbing system of a vehicle having wheels driven to rotate along a road surface, and a spindle mechanism for supporting the wheel and the body work. The spindle mechanism is driven at a predetermined interval in response to roughness of the road surface. The apparatus includes a detector comprising an ultrasonic probe which is arranged on the front side of the front wheel and detects the roughness of the road, a controller which instructs expansion or contraction of spindle mechanism according to the signal of the detector and a running speed signal, and a valve driving mechanism for exciting an electromagnetic valve to charge or discharge hydraulic oil into or from the spindle mechanism according to the instruction. However, since the ultrasonic probe is used as a non-contact type sensor for detecting a road surface roughness, measurement error is liable to be caused by snow, puddles and the like. It is furthermore difficult to select only the roughness data of the road surface from the measurement data in which vibration data of the body work also is included due to the arrangement of the sensor on the body work.

SUMMARY OF THE INVENTION

The present invention has been conceived with an objective to eliminate the above-mentioned drawbacks of the prior art.

It is an object of the present invention to provide an improved apparatus for estimating vibration input to a suspension device, which is capable of correctly detecting a vibration input transferred to the suspension device from a road surface without being affected by vibration of the body work.

To this end, present invention provides an apparatus for estimating vibration input to be transferred from a road surface to the suspension device of a vehicle whose wheels are supported on the body work through the suspension device.

According to the present invention, a stroke detecting means serves to detect a stroke displacement of the suspension, and a differentiating means serves to compute a stroke speed by differentiating the stroke displacement detected by the stroke detecting means. A body work vertical acceleration detecting means serves to detect a vertical acceleration of the body work, and an integrating means serves to compute a vertical speed of the body work by integrating the vertical acceleration detected by the body work vertical acceleration detecting means. An adding means serves to compute a vibration input estimated value by adding the computed values of the differentiating means and integrating means to each other.

The apparatus according to the present invention is to detect the stroke displacement of the suspension device as a value obtained by subtraction between vertical displacement of the wheel and the body work, and is to further detect the vertical acceleration of the body work by means of the body work vertical acceleration detecting means. A stroke speed is obtained by differentiating the stroke displacement by means of the differentiating means, and is added to a vertical speed of the body work obtained by integrating the vertical acceleration of the body work. Therefore, the apparatus according to the invention makes it possible to provide a vibration input estimated value correctly showing a vertical speed of the wheel alone, by canceling the vertical speed of the body work included in the stroke speed.

According to one preferred embodiment of the present invention, for maintaining a high accuracy of the vibration input estimated value over a wide frequency range, the differentiating means for computing the stroke speed by differentiating the stroke displacement detected by the stroke detecting means comprises a high-pass filter having a cutoff frequency which is set at substantially twice the spring-bottom resonance frequency.

The cutoff frequency of the high-pass filter is influential on reduction of a vibration transfer rate of the vibration input transferred from a road surface to the spring top in a frequency range higher than the spring-top resonance frequency. The higher the cutoff frequency is, the higher the accuracy of the estimated vibration input is. However, if the cutoff frequency is higher than substantially twice the spring-bottom resonance frequency (about 10 Hz), the estimation is liable to be affected by noise, while an effect of improving the vibration characteristics is saturated. Accordingly, the estimation accuracy of the vibration input is maintained at a high level by setting the cutoff frequency at nearly twice the spring-bottom resonance frequency.

A high accuracy of the vibration input estimated value over a wide frequency range can also be achieved by another preferred embodiment of the invention wherein the integrating means for computing the vertical speed of the body work by integrating the vertical acceleration value detected by the body work vertical acceleration detecting means may comprise a low-pass filter having a cutoff frequency which is set at substantially one sixth of the spring-top resonance frequency.

The cutoff frequency of the low-pass filter is influential on reduction of the vibration transfer rate of vibration input transferred from a road surface to the spring top in a frequency range lower than the spring-top resonance frequency. The lower the cutoff frequency is, the higher the estimation accuracy of vibration input is though the gain in the vibration transfer rate of the input from a road surface to the spring top becomes lower in a frequency range from 0.2 Hz to 0.7 Hz, for example. Since a suspension system for a vehicle is required to follow the road surface in a frequency range equal to or lower than the spring-top resonance frequency, it may be undesirable to excessively lower the cutoff frequency. Conversely, if the cutoff frequency is brought near to the spring-top resonance frequency, a resonance phenomenon appears while an estimation error of vibration input increases. Therefore, a satisfactory road surface followability can be achieved by maintaining the estimation accuracy of vibration input at a high level, by setting the cutoff frequency of the low-pass filter at nearly one sixth of the spring-top resonance frequency.

BRIEF DESCRIPTION OF THE DRAWINGS

FIG. 1 is a system diagram showing one preferred embodiment of the apparatus according to the present invention;

FIG. 2 is a characteristic diagram showing the relation between the instruction current and the control pressure of the pressure control valve;

FIG. 3 is a characteristic diagram showing the output characteristic of the stroke sensor;

FIGS. 7A and 7B are diagrams showing the gain-to-frequency characteristic and the phase-to-frequency characteristic, respectively, for explaining the estimation accuracy of vibration input from a road surface in case of changing the cutoff frequency of the high-pass filter;

FIGS. 9A and 9B are diagrams showing the gain-to-frequency characteristic and the phase-to-frequency characteristic, respectively, for explaining the estimation accuracy of vibration input from a road surface in case of the changing the cutoff frequency of the low-pass filter;

FIG. 12A and 12B are diagrams showing the gain-to-frequency characteristic and the phase-to-frequency characteristic, respectively, for explaining the estimation accuracy of the vibration input from a road surface; and FIG. 13 is an explanatory diagram showing a one-wheel-one-degree-of-freedom model.

DETAILED DESCRIPTION OF THE PREFERRED EMBODIMENT

Figure 4:
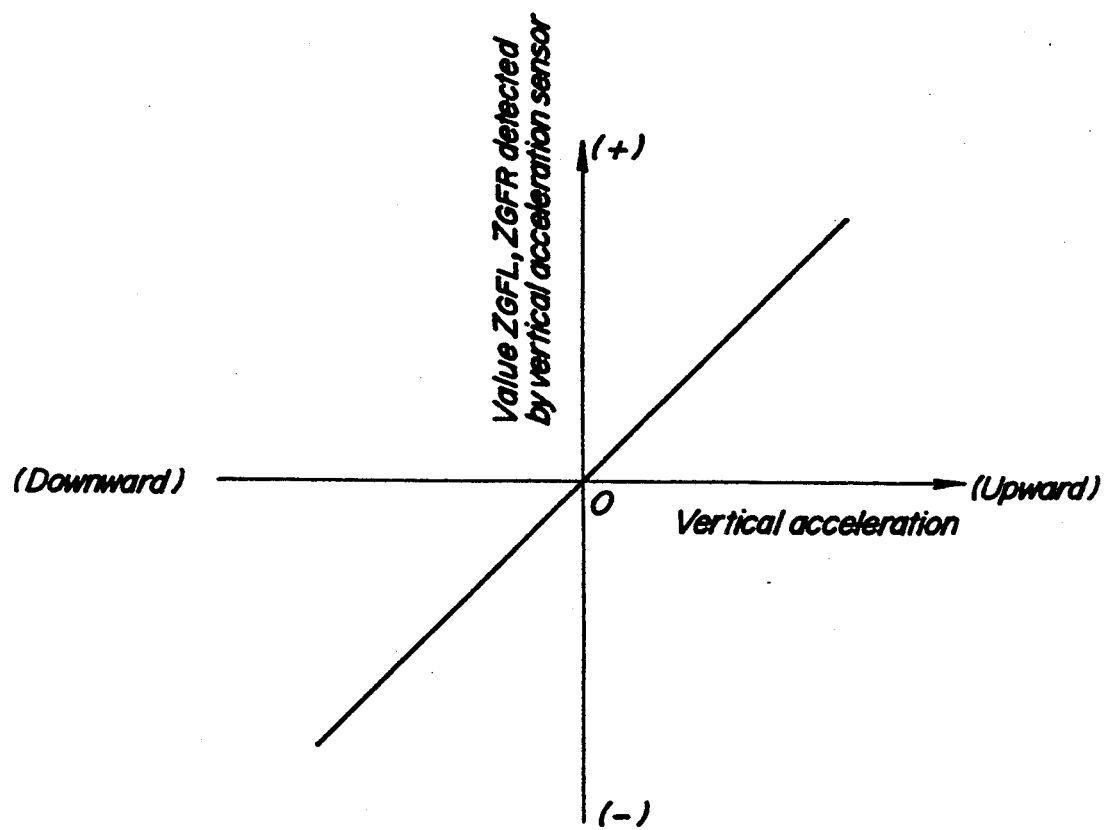
FIG. 4 is a characteristic diagram showing the output characteristic of the vertical acceleration sensor.

One embodiment of the present invention will be more fully explained below, with reference to the accompanying drawings.

FIG. 1 is a system diagram showing one embodiment of the present invention as applied to an active-type suspension system for automotive vehicles for performing a predict control with information of a forward road surface. The vehicle to which the present invention is applied may include body work side members 10, front left to rear right wheels 11FL to 11RR, and the active-type suspension system 12.

As particularly shown in FIG. 1, the active-type suspension system 12 may include hydraulic cylinders 18FL to 18RR, pressure control valves 20FL to 20RR which are identified in FIG. 1 as "PC valves", a hydraulic power source, accumulators 24F and 24R, a vehicle speed sensor 26, stroke sensors 27FL and 27RR, vertical acceleration sensors 28FL to 28RR and a controller 30, which will be individually explained below.

The hydraulic cylinders 18FL to 18RR serve as actuators each arranged between a body work side member 10 and a wheel side member 14 of the wheels 11FL to 11RR. The pressure control valves 20FL to 20RR serve to individually adjust the working pressure of the hydraulic cylinders 18FL to 18RR. The hydraulic power source provides the pressure control valves 20FL to 20RR with a pressurized working oil at a specifically defined pressure level, through a supply piping 21S while retrieving the oil from the pressure control valves 20FL to 20RR through a return piping 21R. The accumulators 24F and 24R serve to maintain the pressure which are set in the supply piping 21S between the hydraulic power source 22 and the pressure control valves 20FL to 20RR. The vehicle speed sensor 26 serves to detect the vehicle speed and output a pulse signal corresponding to the detected speed. The stroke sensors 27FL and 27RR serve to detect the relative displacement between the front wheels 11FL and 11FR and the body work, set in parallel with the front wheel side hydraulic cylinders 18FL and 18FR. The vertical acceleration sensors 28FL to 28RR are identified in FIG. 5 as "VA sensors" in FIG. 5 and serve to individually detect the vertical acceleration of the body work in the locations respectively corresponding to the wheels 11FL to 11RR. Finally, the controller 30 serves to actively control the pressure control valves 20FL to 20RR on the basis of the vertical acceleration values $Z_{GFL}$ to $Z_{GRR}$ detected by the vertical acceleration sensors 28FL to 28RR while individually performing a predict control of output pressures of the pressure control valves 20RL and 20RR in response to the motion of the front wheels on the basis of the values detected by the sensors 26, 27FL to 27FR and 28FL to 28FR.

Each of the hydraulic cylinders 18FL to 18RR has a cylinder tube 18a, in which a pressure chamber L is formed. A piston 18c is arranged in the cylinder tube 18a, and has a through hole in the axial direction. The piston partitions the inside of the cylinder tube 18a so that a thrust is generated according to the difference between the pressure receiving area of the upper and lower faces of the piston 18c. The lower end of the cylinder tube 18a is set on a wheel side member 14 and the upper end of the piston rod 18b is set on a body work side member 10. Each of the pressure chambers L is connected with an output port of the relevant pressure control valve 20FL to 20RR through a hydraulic piping 38. Each of the pressure chambers L of the hydraulic cylinders 18FL to 18RR is connected with an accumulate 34 for absorbing the vibration of a spring bottom through a throttle valve 32. A coil spring 36 with a relatively small spring constant is set between the spring-top and spring-bottom locations of each of the hydraulic cylinders 18FL to 18RR, for supporting the static load of the body work.

Each of the pressure control valves 20FL to 20RR comprises a known 3-port proportional electromagnetic pressure reducing valve as disclosed, for example, in JP-A-64-74111 whose disclosure is herein incorporated by reference. As known in the art, such a pressure reducing valve has a cylindrical valve housing containing a spool which can be freely slid in it and a proportional solenoid fitted together with this. By adjusting the intensity of an instruction current i (instruction value) to be supplied to an exciting coil of the proportional solenoid, each of the pressure control valves 20FL to 20RR can control displacement of a poppet in the valve housing and hence the location of the spool, thereby to control the working oil flowing between the hydraulic power source 22 and the hydraulic cylinders 18FL to 18RR through the feed port and output port or through the output port and return port.

The relation between the instruction current i (i.e., $i_{FL}$ to $i_{RR}$) applied to the exciting coil and the control pressure P delivered from the output port of the pressure control valve 20FL (to 20RR) is as shown in FIG. 2. Thus, the minimum control pressure $P_{MIN}$ is given at the time of the minimum current $i_{MIN}$ in consideration of noise and increases the control pressure P in linear proportion to the current i when increasing the current i from this state. Further, the maximum control pressure $P_{MAX}$ corresponding to a specified line pressure of the hydraulic power source 22 is given at the time of the maximum current $i_{MAX}$. In FIG. 2, $i_N$ is a neutral instruction current and $P_{CN}$ is a neutral control pressure.

As shown in FIG. 3, each of the stroke sensor 27FL and 27FR is made to output a stroke displacement value $H_{FL}$ or $H_{FR}$ which comes to the neutral voltage $V_s$ of zero when the vehicle height is equal to a predetermined target height, to a positive voltage corresponding to the difference between the two heights when the vehicle height becomes higher than the target height, and to a negative voltage corresponding to the difference between the two heights when the vehicle height becomes lower than the target height.

Each of the vertical acceleration sensors 28FL to 28RR as shown in FIG. 4 is made to output a vertical acceleration value $Z_{GFL}$ or $Z_{GFR}$ which comes to the zero voltage when the vertical acceleration is zero, to a positive analog voltage corresponding to the acceleration when detecting an upward acceleration, and to a negative analog voltage corresponding to the acceleration when detecting a downward acceleration.

Figure 5:
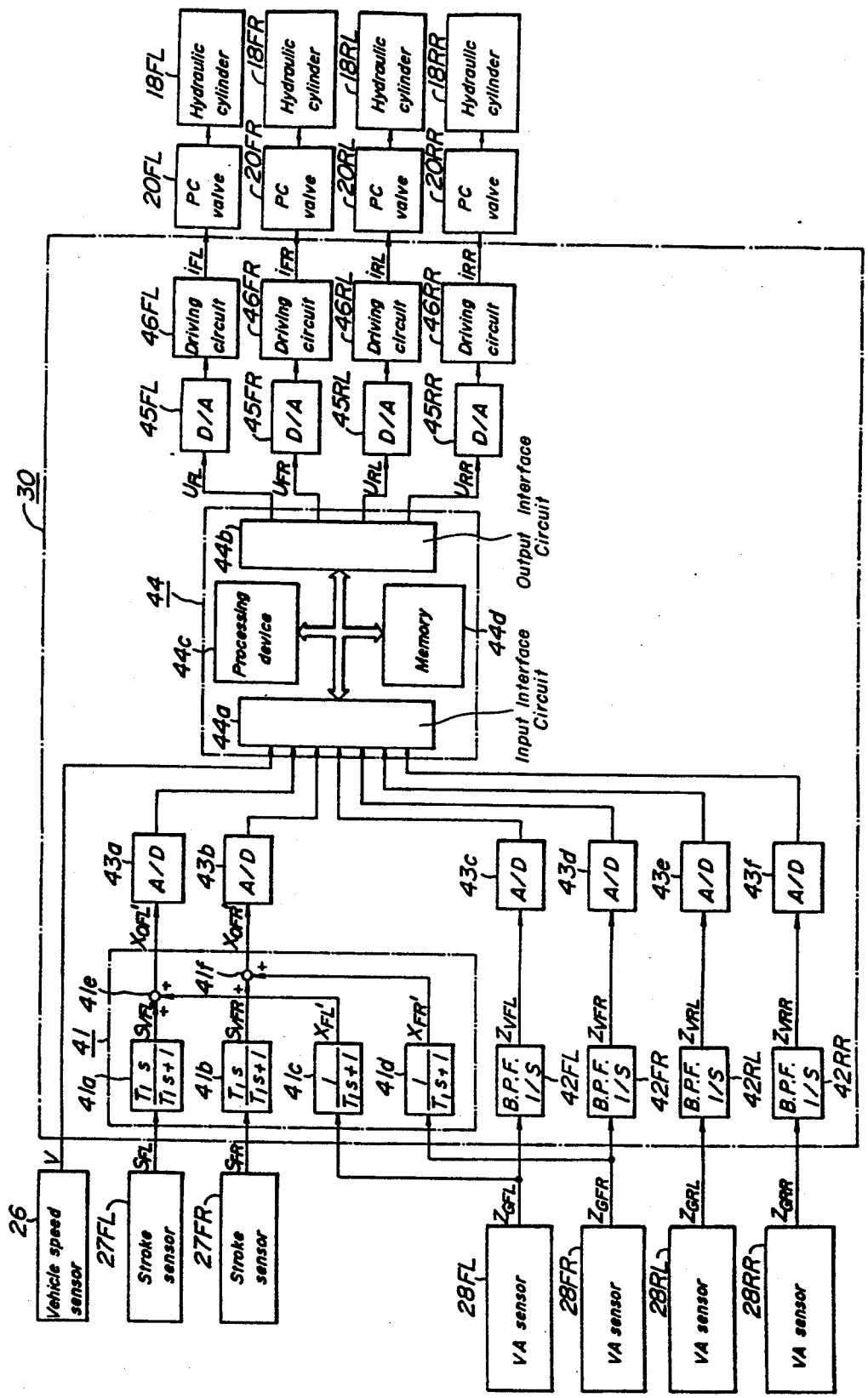
FIG. 5 is a block diagram showing one example of controllers.

As shown in FIG. 5, the controller 30 may include a vibration input estimating circuit 41, integrating circuits 42FL to 42RR, A/D converters 43a to 43f, a microprocessor unit 44 and driving circuits 46FL to 46RR, which will be individually explained below.

The vibration input estimating circuit 41 serves to output differential values $X_{IFL}'$ and $X_{IFR}'$ of the road surface displacements of the front wheels which correctly follow the road surface varying in shape, on the basis of the stroke displacements $S_{FL}$ and $S_{FR}$ outputted from the stroke sensors 27FL and 27FR and the body work vertical accelerations $Z_{GFL}$ and $Z_{GFR}$ outputted from the acceleration sensors 28FL and 28FR on the front wheel side out of the vertical acceleration sensors 28FL to 28RR. The integrating circuits 42FL to 42RR serve to compute the spring-top speeds $Z_{VFL}$ to $Z_{VRR}$, by integrating the vertical accelerations $Z_{GFL}$ to $Z_{GRR}$ inputted from the vertical acceleration sensors 28FL to 28RR. The integrating circuits 42FL to 42RR are composed, for example, of band-pass filters. The A/D converters 43a to 43f serve to convert into digital values the differential values $x_{OFL}'$ and $x_{OFR}'$ of the road surface displacements outputted from the vibration input estimating circuit 41 and the spring-top speeds $Z_{VFL}$ to $Z_{VRR}$ outputted from the integrating circuits 42FL to 42RR. The microprocessor unit 44 is supplied with data relating to the vehicle speed V detected by the vehicle speed sensor 26 and the digital values outputted from the A/D converters 43a to 43f. The driving circuits 46FL to 46RR are supplied with pressure instruction values $P_{FL}$ to $P_{RR}$ outputted from the microprocessor unit 44 through D/A converters 45FL to 45RR, and serve to convert the supplied values into driving current $i_{FL}$ to $i_{FR}$ to be supplied to the pressure control valves 20FL to 20RR. The driving circuits 46FL to 46RR are composed, for example, of floating-type constant-voltage circuits.

As shown in FIG. 5, the vibration input estimating circuit 41 includes differentiating circuits 41a and 41b for differentiating the stroke displacements $S_{FL}$ and $S_{FR}$ from the stroke sensor 27FL and 27FR to compute stroke speeds $S_{VFL}$ and $S_{VFR}$, integrating circuits 41c and 42d for integrating the body work vertical accelerations $Z_{GFL}$ and $Z_{GFR}$ from the vertical acceleration sensors 28FL and 28FR to compute differential values $X_{FL}'$ and $X_{FR}'$ of the spring-top displacements, and adders 41e and 42f for adding the stroke speeds $S_{VFL}$ and $S_{VFR}$ outputted from the differentiating circuits 41a and 41b, to the differential values $X_{FL}'$ and $X_{FR}'$ of the spring-top displacements outputted from the integrating circuits 41c and 41d, respectively. The adders 41e and 41f output the differential values $X_{OFL}'$ and $X_{OFR}'$ of the road surface displacements of the front wheels correctly following the road surface varying in shape.

The stroke displacements $S_{FL}$ and $S_{FR}$ outputted from the stroke sensors 27FL and 27FR, each of which shows relative displacement between the spring bottom and spring top, are obtained respectively by subtracting the spring-top displacements $x_{FL}$ and $x_{FR}$ of the body work from the spring-bottom displacements $x_{OFL}$ and $x_{OFR}$ of the front wheels 11FL and 11FR, as shown in the following expressions (1) and (2).

$$S_{FL} = x_{OFL} - x_{FL} \tag{1}$$

$$S_{FR} = x_{OFR} - x_{FR} \tag{2}$$

Therefore, since the stroke speeds $S_{VFL}$ and $S_{VFR}$ obtained by differentiating the stroke displacements $S_{FL}$ and $S_{FR}$ by means of the differentiating circuits 41a and 41b result in the values respectively obtained by subtracting the differential values $x_{FL}'$ and $x_{FR}'$ of the spring-top displacements from the differential values $x_{OFL}'$ and $x_{OFR}'$ of the spring-bottom displacements, the differential values $x_{OFL}'$ and $x_{OFR}'$ of only the road surface displacements following an actual road surface can be obtained respectively by adding these stroke speeds $S_{VFL}$ and $S_{VFR}$ to the differential values $X_{FL}'$ and $x_{FR}'$ of the spring-top displacements obtained by integrating the vertical accelerations $Z_{GFL}$ and $Z_{GFR}$ to cancel the differential values $x_{FL}'$ and $x_{FR}'$.

Figure 8:
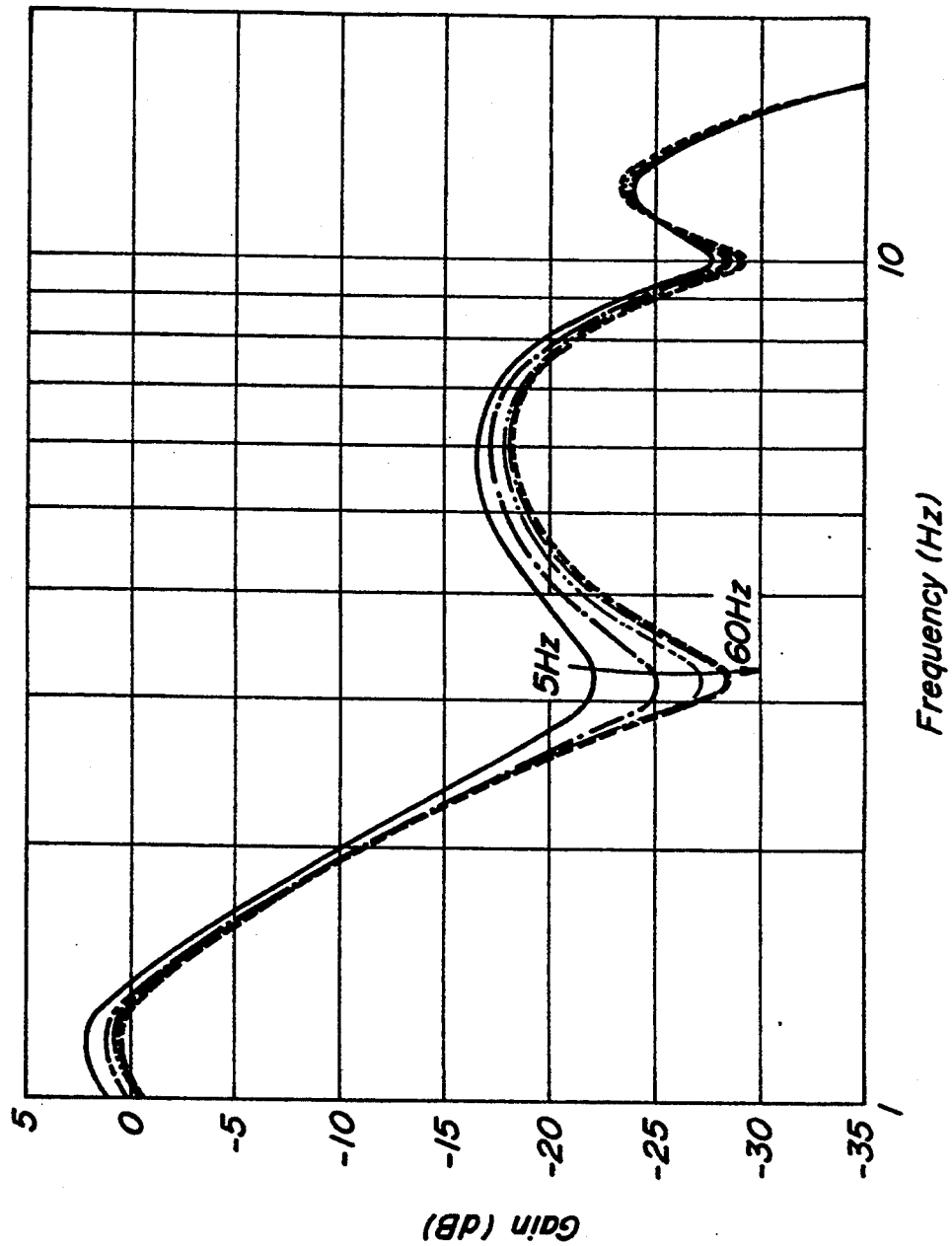
FIG. 8 is a characteristic diagram showing the vibration transfer rate of the vibration input from a road surface to a spring top in case of changing the cutoff frequency of the high-pass filter.

In addition to an ideal differentiating circuit, each of the differential circuits 41a and 41b may comprise a high-pass filter having a cutoff frequency $f_{HC}$ which is set at nearly twice the spring-bottom resonance frequency, for example, 20 Hz. The reason why the cutoff frequency $f_{HC}$ of the high-pass filter is set at 20 Hz is as follows. As will be explained hereinafter, a simulation test of a predict control for the rear wheel with the controller 30 has been performed, using the integrating circuits 41c and 41d comprising low-pass filters whose cutoff frequency $f_{LC}$ was 0.2 Hz and whose cutoff frequency $f_{HC}$ was set at 5 Hz, 10 Hz, 20 Hz, 40 Hz and 60 Hz. The result of this simulation test is shown in FIGS. 7A and 7B which are diagrams representing the gain-to-frequency and phase-to-frequency characteristics for explaining the estimation accuracy of input data from a road surface. It can be appreciated that the higher the cutoff frequency is, the higher the estimation accuracy of the input data from a road surface becomes as both gain and phase come closer to the solid-line curve of actual motion of the spring bottom shown in FIGS. 7A and 7B. On the other hand, as shown in FIG. 8 showing the vibration transfer rate of the vibration input from a road surface to the spring top of the rear wheel side, the higher the cutoff frequency $f_{HC}$ is raised, the lower the vibration transfer rate can be reduced in a range of high frequency from the spring-top resonance frequency (about 1.2 Hz) to the spring-bottom resonance frequency (about 10 Hz) to improve a vibration isolating ability of the suspension. However, if the cutoff frequency $f_{HC}$ exceed 20 Hz, an effect of improving the estimation accuracy of the input data from the road surface and improving the vibration isolating ability comes near to a saturated state while estimation of the input data is liable to be affected by noise. Thus, in order to estimate the input data from a road surface with high accuracy, it is desirable to set the cutoff frequency $f_{HC}$ at 20 Hz which is substantially twice the spring-bottom resonance frequency. The cutoff frequency $f_{HC}$ of the high-pass filter is set through setting the time constant $T_1$ of a transfer function $[T_1s/(T_1s+1)]$ such that $T_1=1/(2\pi \cdot f_{HC})$.

Figure 10:
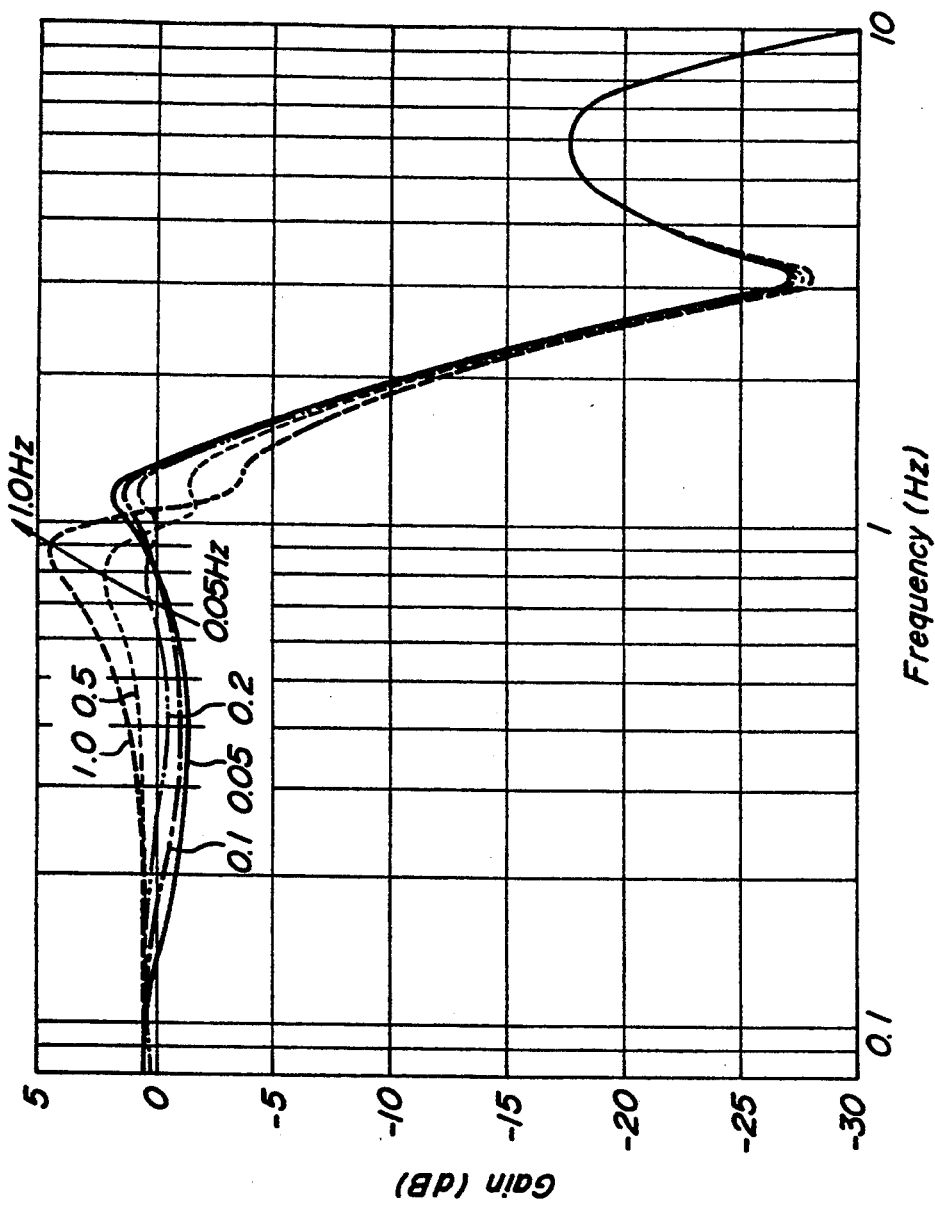
FIG. 10 is a characteristic diagram showing the vibration transfer rate of the vibration input from a road surface to the spring top in case of changing the cutoff frequency of the low-pass filter.

Similarly, in addition to an ideal integrating circuit, for example, each of the integrating circuits 41c and 41d may comprise a low-pass filter whose cutoff frequency $f_{LC}$ is set at nearly one sixth of the spring-top resonance frequency, for example, at 0.2 Hz. The reason why the cutoff frequency $f_{LC}$ of the low-pass filter is set at 0.2 Hz is as follows. As will be explained hereinafter, a simulation test of a predict control for the rear wheel by the controller 30 has been performed, using differentiating circuits 41a and 41b comprising a high-pass filter whose cutoff frequency $f_{HC}$ was set at 20 Hz and whose cutoff frequency fLC was set at 0.05 Hz, 0.1 Hz, 0.2 Hz, 0.5 Hz and 1.0 Hz. The result of this simulation test is represented in FIGS. 9A and 9B which show the gain-to-frequency and phase-to-frequency characteristics for explaining the estimation accuracy of input data from a road surface. It will be appreciated that the lower the cutoff frequency $f_{LC}$ is, the higher the estimation accuracy of the input data from a road surface is as both gain and phase come nearer to the solid-line curve of the actual motion of the spring bottom shown in FIGS. 9A and 9B in a frequency range lower than the spring-top resonance frequency. However, the lower the cutoff frequency $f_{LC}$ is, the lower the gain is in a range of low frequency from 0.2 Hz to 0.7 Hz, as appreciated from FIG. 10 which shows the vibration transfer rate of the input from a road surface to the spring top on the rear wheel side. Since a suspension system is required to follow the road surface varying in shape, it is undesirable to excessively lower the cutoff frequency $f_{LC}$. On the other hand, if the cutoff frequency $f_{LC}$ is raised, a resonance phenomenon comes out, as shown in FIG. 10, with increase in the estimation error. From the result of above-mentioned simulation tests, therefore, in order to accurately estimate the vibration input from a road surface, it is desirable to set the cutoff frequency of the low-pass filter at nearly one sixth of the spring-top resonance frequency, for example at 0.2 Hz. The cutoff frequency $f_{LC}$ of the low-pass filter is set through setting the time constant $T_2$ of a transfer function $[1/(T_2s+1)]$ such that $T_2=1/(2\pi f_{LC})$.

Figure 11:
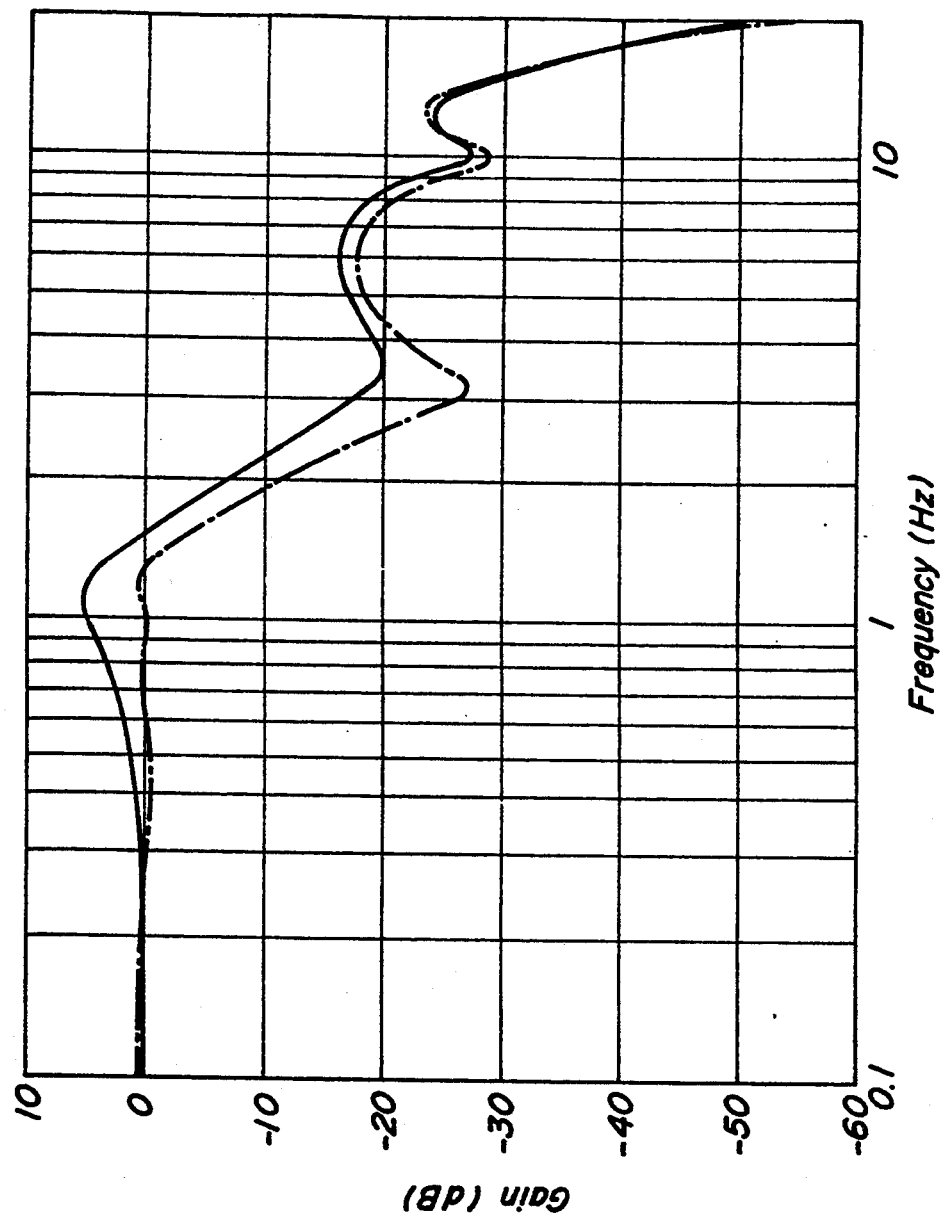
FIG. 11 is a characteristic diagram showing the vibration of the spring top to the vibration input from a road surface in case of setting the cutoff frequency of the high-pass filter at 20 Hz and the cutoff frequency of the low-pass filter at 0.2 Hz.

A predict control in accordance with the present invention using the differentiating circuits 41c and 41b each of which includes a high-pass filter whose cutoff frequency $f_{HC}$ is 20 Hz and the integrating circuits 41c and 41d each of which includes a low-pass filter whose cutoff frequency $f_{LC}$ is 0.2 Hz as shown by a dashed-line curve in FIG. 11, is compared with a conventional predict control shown by a solid-line curve in FIG. 11. It will be appreciated that the present invention is advantageous in that it serves to maintain the gain of the spring-top vibration characteristics at a low level over a wide frequency range, to provide a good vibration isolating ability, and to realize an improved response characteristics as shown by solid-line curves in FIG. 12A and 12B, which are nearly equal to the response characteristics shown by the dashed-line curve of a wheel to vibration input from a road surface in case of using an ideal differentiating circuit and an ideal integrating circuit. Therefore, the predict control in accordance with the present invention makes it possible to estimate the vibration input from a road surface with high accuracy.

The microprocessor unit 44 has at least an input interface circuit 44a, an output interface circuit 44b, a processing device 44c, and a memory 44d. A vehicle speed value V and an output data from the A/D converters 43a to 43f are entered into the input interface circuit 44a, and pressure instruction values $P_{FL}$ to $P_{RR}$ for the respective pressure control valves 20FL to 20RR are outputted from the output interface circuit 44b to the D/A converters 45FL to 45RR. The processing device 44c, while executing the procedure to be explained hereinafter with reference to FIG. 6, reads the vehicle speed value V, the differential values $x_{OFL}'$ and $x_{OFR}'$ of the road surface displacements, and the body work vertical speeds $Z_{VFL}$ to $Z_{VRR}$ at intervals of a predetermined sampling time $T_s$ (20 ms for example), stores the differential values $x_{OFL}'$ and $x_{OFR}'$ of the road surface displacements together with a delay time $t_R$ between the front and rear wheels computed on the basis of the vehicle speed value V into a storage area corresponding to a specifically ordered shift register formed in the memory 44b as shifting them one by one in order, stores the delay time $\tau_R$ as subtracting one by one the sampling time $T_s$ when shifting, computes a control force for an active control for displaying a skyhook damper function on the basis of each of the body work vertical speed values $Z_{VFL}$ to $Z_{VRR}$ output from the integrating circuits 42FL to 42RR. The processing device 44c further computes control forces $U_{RL}$ and $U_{RR}$ for a predict control to be generated in the hydraulic cylinders 18RL and 18RR of the actuators on the rear wheel side, on the basis of the differential values $x_{OFL}'$ and $x_{OFR}'$ of the road surface displacements at the time when the delay time $\tau_R$ comes to zero, and outputs the resulting force values obtained by adding respectively both of the control forces $U_{RL}$ and $U_{RR}$ and the control forces for an active control to the D/A converters 45FL to 45RR as the pressure instruction values for the respective pressure control valves 20FL to 20RR.

The memory 44d stores in advance a program necessary for the processing device 44c to make a processing operation, makes a shift register area for storing a specified number of differential value $x_{OFL}'$ and $x_{OFR}'$ of the road surface displacements which are read at intervals of a specified sampling time $T_s$ together with delay time $\tau_R$ as shifting them one by one in order, and stores the necessary results of operation of the processing device 44c in order.

The function and operation of the embodiment will be explained below, with reference to a flowchart in FIG. 6 which shows a processing procedure of the processing device 44c in the microprocessor unit 44.

Figure 6:
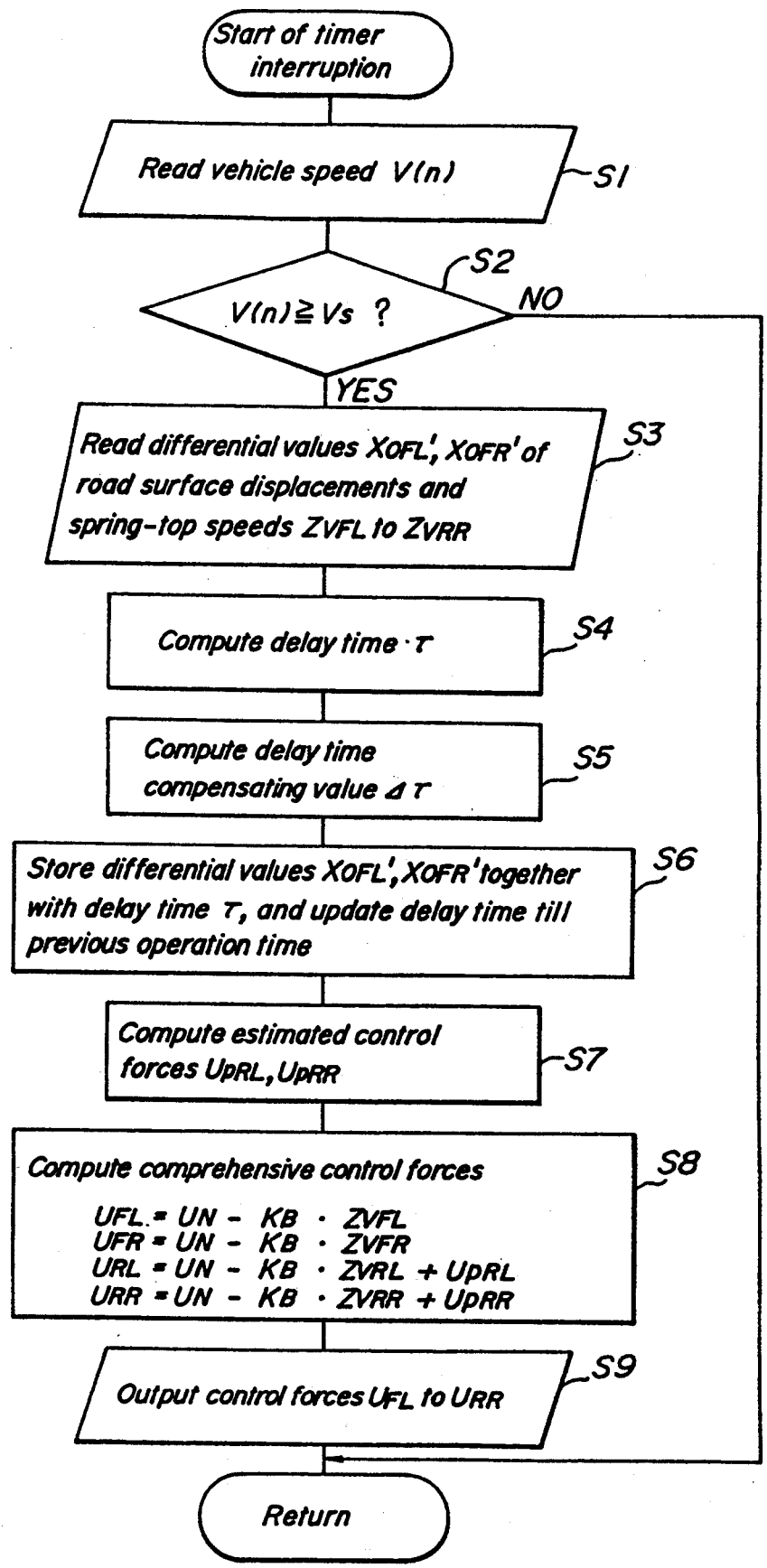
FIG. 6 is a flowchart showing one example of processing procedures of the microprocessor unit.

The processing shown in FIG. 6 is executed as an interruption process at intervals of a predetermined sampling time $T_s$ (20 ms, for example). First, in a step S1, the processing device 44c reads the vehicle speed value V(n) detected by the existing vehicle speed sensor 26 and next, it proceeds to a step S2 to determine whether or not the vehicle speed value V(n) is equal to or greater than a predetermined speed value $V_s$. If $V(n) < V_s$, then it terminates the timer interruption process as it is and returns to a specified main program, and if $V(n) > V_s$, then it proceeds a step S3.

In the step S3, the processing device 44c reads the differential value $x_{OFL}'$ and $x_{OFR}'$ of the road surface displacements from the vibration input estimating circuit 41 and the body work vertical speeds $Z_{VFL}$ and $Z_{VFR}$ from the integrating circuits 42FL and 42FR, and then it proceeds to a step S4 to operate the following equation (3) on the basis of the vehicle speed value V thereby to compute a delay time $\tau_R$ until the rear wheels 11RL and 11RR reach a location on a road surface passed by the front wheels 11FL and 11FR.

$$\tau_R = (L/V) - \tau_s \tag{3}$$

where L is a wheel base and $\tau_s$ is a delay time of the control system which is obtained by adding together a response delay time $t_1$, a computing loss time $t_2$ of the controller, and a phase delay time $t_3$ of the filter.

Next, the processing device 44c proceeds to a step S5 to compute an incremental speed $\Delta V$ per unit time Ts which is obtained by subtracting the last vehicle speed value V(n−1) one sampling time $T_s$ before the present time from the present vehicle speed value V(n), and to compute a delay time compensating value $\Delta t$ by dividing the wheel base L by the incremental speed $\Delta V$.

Next, proceeding to a step S6, the processing device 44c stores the differential values $x_{OFL}'$ and $x_{OFR}'$ of the road surface displacements which were read in the step S3 and the delay time tR computed in the step S4 into the beginning location of the shift register area formed on the memory 44d, while shifting one by one in order other differential values $x_{OFL}'$ and $x_{OFR}'$ of other road surface displacements and other delay time $\tau_R$ which have been stored till the last time. When shifting delay time $\tau_R$, it stores as a newly updated delay time $\tau_R$ a value obtained by subtracting the sampling time $T_s$ and the delay time compensating value $\Delta t$ calculated in the step S5 from each delay time $\tau_R$ stored in the location to be shifted.

Next, proceeding to a step S7, the processing device 44c reads the differential values $x_{OFL}'$ and $x_{OFR}'$ of the road surface displacements which are the earliest stored in the shift register area, namely, the delay time $\tau_R$ of which has become zero. The processing device 44c further operates the following equations (4) and (5) by using these values, computes the predict control forces $U_{PRL}$ and $U_{PRR}$ for the pressure control valves 20RL and 20RR of the rear wheel side, and eliminates the differential values $x_{OFL}'$ and $x_{OFR}'$ of the earliest road surface displacements and the corresponding delay time $\tau_R$ from the shift register area.

$$U_{PRL} = -[C_p + \{1/(\omega_1 + s)\}K_p]x_{OFL}' \tag{4}$$

$$U_{PRR} = -[C_p + \{1/(\omega_1 + s)\}K_p]x_{OFR}' \tag{5}$$

where $C_p$ is a damping force control gain, $K_p$ is a spring force control gain, and $\omega_1$ is a constant value obtained by multiplying a cutoff frequency $f_c$ for control by $2\pi$. The values $C_p$ and $K_p$ are set as $C_p < C$ and $K_p < K$ with regard to the damping constant C and spring constant K of an actual suspension, and $\omega_1$ is set as $\omega_1 > 0$.

The reason why the predict control forces are computed with the equations (4) and (5) is as follows. In the embodiment of the invention, an active control is not made in a range of the spring-bottom resonance frequency similarly to a conventional active suspension and the vibration is to be suppressed mainly in a range of the spring-top resonance frequency of 5 Hz or less. Then, as shown in FIG. 13, a one-wheel motion model of the embodiment having a spring element K, a damping element C and a control element U disposed in parallel with each other on a road surface and further having a spring-top mass M disposed over these elements, can be considered as a 1-degree-of-freedom model in which an external force F acts on the spring-top mass M. In FIG. 13, $X_0$ denotes the road surface displacement and X denotes the spring-top displacement.

The equation of motion of this 1-wheel 1-degree-of-freedom model can be expressed as follows.

$$MX_0'' = C(X_0' - X') + K(X_0 - X) - F + U \tag{6}$$

By reducing the equation (6) for the spring-top displacement X, the following equation (7) can be obtained.

$$X = \frac{Cs + K}{MS^2 + CS + K} X_0 - \tag{7}$$

$$\frac{F}{MS^2 + CS + K} + \frac{U}{MS^2 + CS + K}$$

Since $x_{OFL}' = sx_{OFL}$ in the equation (4), for example, if the equation (4) is substituted into the equation (7) assuming $\omega_1 = 0$, $C_p = C$ and $K_p = K$, the equation (7) results in the following:

$$X = \frac{Cs + K}{MS^2 + CS + K} (X_0 - X_{OFL}) - \frac{F}{MS^2 + CS + K} \quad (8)$$

Since in the equation (8) the estimation of the road surface displacement by means of the road surface input estimating circuit 41 is sufficiently high in accuracy, namely $(x_0 - x_{OFL}) = 0$, the equation (8) results in the following:

$$X \approx \frac{F}{MS^2 + CS + K} \quad (9)$$

Thus, the vibration from a rough road surface is little transferred to the body work so that a comfortable ride can be achieved.

Next, proceeding to a step S8, the processing device 44c computes the comprehensive control forces $U_{FL}$ to $U_{RR}$ according to the following equations (10) to (13).

$$U_{FL} = U_N - K_B \cdot V_{FL} \quad (10)$$

$$U_{FR} = U_N - K_B \cdot V_{FR} \quad (11)$$

$$U_{RL} = U_N - K_B \cdot V_{RL} + U_{PRL} \quad (12)$$

$$U_{RR} = U_N - K_B \cdot V_{RR} + U_{PRR} \quad (13)$$

where $U_N$ is a control force necessary for keeping the vehicle height at a target height, and $K_B$ is a bounce control gain.

Then, proceeding to A step S9, after outputting the control force values $U_{FL}$ to $U_{RR}$ computed in the step S8 into the D/A converters 45FL to 45RR, respectively, as pressure instruction values, it terminates the timer interruption process and returns to a specified main program.

Now, it is assumed that a vehicle is running straight at a constant speed faster than a predetermined vehicle speed $V_s$ on a flat and good road as keeping its vehicle height at a target height. In this state, the displacements $S_{FL}$ and $S_{FR}$ detected by the stroke sensors 27FL and 27FR set on the front wheel side are nearly zero since the vehicle keeps its height at a target height on the road, and the accelerations $Z_{GFL}$ to $Z_{GRR}$ respectively detects by the vertical acceleration sensors 28FL to 28RR are nearly zero since vibration of the body work side members 10 is not generated. Thus, the differential values $S_{VFL}$ and $S_{VFR}$ of the stroke displacements outputted from the differentiating circuits 41a and 41b of the vibration input estimating circuit 41 and the differential values $x_{FL}'$ and $x_{FR}'$ of the spring-top displacements outputted from the integrating circuits 41c and 41d are nearly zero. Therefore, the differential values $x_{OFL}'$ and $x_{OFR}'$ of the road surface displacements outputted from the adders 41e and 42f are also nearly zero. The vertical acceleration values $Z_{GFL}$ to $Z_{GRR}$ are nearly zero, so that the spring-top speeds $Z_{VFL}$ to $Z_{VRR}$ outputted from the integrating circuits 42FL to 42RR are also zero.

The differential values $x_{OFL}'$ and $x_{OFR}'$ of the road surface displacements and the spring-top speeds $Z_{VFL}$ to $Z_{VRR}$ are entered into the microprocessor 44 together with the vehicle speed value V.

In a state of keeping a vehicle running on an even and good road like this, since the differential values $x_{OFL}'$ and $x_{OFR}'$ of the road surface displacements to be stored into the shift register area in order in the step S6 in the process shown in FIG. 6 which is executed by the microprocessor unit 44 at intervals of a specified sampling time $T_s$ are kept at a level of zero, the differential values $x_{OFL}'$ and $x_{OFR}'$ of the road surface displacements as computed in the step S4 after the lapse of a delay time $\tau_R$ are also kept at zero and the predict control forces $U_{PRL}$ and $U_{PRR}$ computed in the step S7 are also zero. The spring-top speeds $Z_{VFL}$ to $Z_{VRR}$ are also zero, the comprehensive control forces $U_{FL}$ to $U_{RR}$ computed in the step S8 come to values corresponding to only the neutral pressure control force $U_N$ for keeping the vehicle height at the target height and these values are outputted to the driving circuits 46FL to 46RR through the output interface circuit 44b and the D/A converters 45FL to 45RR.

The driving circuits 46FL to 46RR convert these values into the instruction currents $i_{FL}$ to $i_{RR}$ corresponding to the pressure instruction values $P_{FL}$ to $P_{RR}$ and supplies and supplies these currents iFL to iRR to the pressure control valves 20FL to 20RR. As the result, the neutral pressure $P_{CNF}$ and $P_{CNR}$ necessary for keeping the height at the target height are outputted from the pressure control valves 20FL to 20RR into the hydraulic cylinders 18FL and 18FR on the front wheel side and into the hydraulic cylinders 18RL and 18RR on the rear wheel side. Thus, each of these hydraulic cylinders 18FL to 18RR generates a thrust for keep a stroke between the body work side member 10 and the wheel side member 14 so as to keep the height at the target height.

When the running state of the vehicle changes from the straight running state on the good road into a state of passing a so-called ramp-step road with difference in level where the front left and right wheels 11FL and 11FR suddenly rise up at the same time like stepping up, the front wheels 11FL and 11FR are bounced by running onto the ramp step. This bounce sharply increases the stroke displacement $S_{FL}$ and $S_{FR}$ detected by the stroke sensors 27FL and 27FR from zero to some positive values. At the same time, an upward acceleration is generated in the body work side members 10 and the acceleration values $Z_{GFL}$ and $Z_{GFR}$ detected by the vertical acceleration sensors 28FL and 28FR of the front left and right wheels increase in the positive direction.

The stroke displacements $S_{FL}$ and $S_{FR}$ and the vertical acceleration values $Z_{GFL}$ and $Z_{GFR}$ are inputted into the vibration input estimating circuit 41, so that the vibration input estimating circuit 41 outputs to the microprocessor unit 44 the differential values $x_{OFL}'$ and $x_{OFR}'$ of the road surface displacements exactly in accordance with the road surface, which are not affected by the vertical motion of the body work side member 10 as described above.

Then, the microprocessor unit 44 computes a delay time $\tau_R$ until the rear wheels 11RL and 11RR reach a location on a road surface passed by the front wheels 11FL and 11FR, according to the equation (3) in the step S4 and stores the delay time $\tau_R$ and the differential values $x_{OFL}'$ and $x_{OFR}'$ of the road surface displacements into the beginning location of the shift register area. ON this occasion, the shift register shifts one by one in order other differential values $x_{OFL}40$ and $x_{OFR}'$ of other road surface displacements which have been zero till the last time, and stores as a newly updated delay time $\tau_R$ a value obtained by subtracting the sampling time Ts and the delay time compensating value $\Delta t$ computed in the step S5 from each delay time $\tau_R$.

At this time, the differential values $x_{OFL}'$ and $x_{OFR}'$ of the respective road surface displacements till the last time stored in the shift register area are zero. Therefore, the predict control forces $U_{PRL}$ and $U_{PRR}$ for the rear wheels computed in the step S7 are kept at zero, and the control forces $U_{RL}$ and $U_{RR}$ for the rear wheels are kept at the neutral control force $U_N$. However, the acceleration values $Z_{GFL}$ and $Z_{GFR}$ detected by the vertical acceleration sensors 28FL and 28FR in the position of the front wheels 11FL and 11FR have been increased in the positive direction, so that the comprehensive control forces $U_{FL}$ and $U_{FR}$ for the front wheels computed in the step S8 are made less than the neutral force $U_N$ according to a rising speed of the body work brought by running onto the ramp step. This results in reduction of the instruction currents $i_{FL}$ and $i_{FR}$ outputted from the driving circuits 46FL and 46FR, reduction of the control pressure $P_c$ outputted from the pressure control valves 20FL and 20FR so as to be lower than the neutral pressure $P_{CNF}$, reduction of the thrust of each of the hydraulic cylinders 18FL and 18FR, and shortening of the strokes on the front wheel side. Therefore, the vibration of the body work side member 10 to be caused by running of the front wheels 11FL and 11FR onto the ramp step can be suppressed by displaying a skyhook damper function.

After this, when the front wheels 11FL and 11FR have passed the ramp-step road, the respective control forces for the front wheels 11FL and 11FR return to the control forces $U_{FL}$ and $U_{FR}$ for keeping the vehicle height at the target height. However, as for the rear wheels 11RL and 11RR, at the point of time when the delay time $\tau_R$ computed in the step S4 becomes zero, namely, when the rear wheels 11RL and 11RR pass the ramp-step road, the differential values $x_{OFL}'$ and $x_{OFR}'$ of the road surface displacements at the time when the front wheels 11FL and 11FR ran onto the ramp step in the step S7 are read out. The predict control forces $U_{PRL}$ and $U_{PRR}$ for the rear wheels are computed according to the equations (4) and (5) on the basis of these differential values, so that the vibration caused by the rough road surface is hardly transferred to the body work as shown by the equation (9). As the result, a comfortable ride can be achieved. Furthermore, when an upward acceleration is generated in the body work side member 10 on the rear wheel side as a result of running the rear wheels 11RL and 11RR onto the ramp step, the acceleration values are detected by the vertical acceleration sensors 28RL and 28RR and integrated by the integrating circuits 42RL and 42RR into the spring-top speeds $Z_{VRL}$ and $Z_{VRR}$. When these spring-top speed values $Z_{VRL}$ and $Z_{VRR}$ are inputted into the microprocessor unit 44, a skyhook damper function is displayed in the step S8 so as to control the active control force for suppressing the rising of the body work side member 10 and the pressure control valves 20RL and 20RR. As the result, the hydraulic pressure to be applied to the hydraulic cylinders 18RL and 18RR are controlled to suppress the vibration of the body work.

If the control forces $U_{PRL}$ and $U_{PRR}$ are computed by means of the equations (4) and (5) in which $\omega_1 = 0$, a steady-state gain (when $s=0$) of the control forces $U_{PRL}$ and $U_{PRR}$ to the road surface displacements (wheel displacement) $x_{OFL}$ and $x_{OFR}$ come to K. Consequently, there is no problem for a temporary hollow or bump. However, in case of running on such a road surface as the above-mentioned ramp-step road whose road surface displacements $X_{OFL}$ ($=x_{OFL}$) and $X_{OFR}$ ($=x_{OFR}$) are kept as they have changed, even when the vehicle comes on a flat road surface, the control forces $U_{PRL}$ and $U_{PRR}$ do not come to zero and the stroke displacements are kept as they are, which are made to balance the control forces $U_{PRL}$ and $U_{PRR}$ with spring forces of the suspension springs having a spring constant K, and a state is kept where the vehicle height does not return to its original height. Namely, supposing the initial value of the vehicle height as h, a state is kept where $(X_0 - x_0) - h = U/K \neq 0$. In order that the vehicle height can return to its initial height when the vehicle comes on a flat road surface after running on such a road surface, it will do to specify $\omega_1 > 0$ in the equations (4) and (5) so that the steady-state gain of the control forces $U_{PRL}$ and $U_{PRR}$ to the wheel vertical speed estimated value $x_0$ may be zero.

In case that one of the front wheels 11FL and 11FR (only the front left wheel 11FL, for example) has run onto a temporary bump, the predict control is performed only for the hydraulic cylinder 18RL on the left wheel side while a control for keeping a neutral pressure is performed with respect to the hydraulic cylinder 18RR for the right wheel which has not run onto a bump.

When the front wheel 11FL or 11FR has fallen in a temporary hollow, vibration of the body work can be suppressed by making the control reverse to the above-mentioned control. Furthermore, even when running on a road surface of not only a temporary roughness but also a consecutive roughness, a predict control can be performed for the rear wheel in response to the motion of the front wheel.

The illustrated embodiment makes it possible to use the stroke sensors 27FL and 27FR and the vertical acceleration sensors 28FL and 28FR which are arranged near the front wheels 11FL and 11FR as means for detecting the forward road surface information. These sensors may be conventional sensors mounted on an active suspension system now in use, so the embodiment has an advantage that it is unnecessary to develop a new sensor or to mount additional sensors.

It will be readily appreciated from the foregoing description that the present invention provides an improved apparatus for estimating the vibration input to a suspension device, in that it can estimate a vibration input from a road surface with high accuracy without using such a sensor as non-contact-type distance sensor, wheel acceleration sensor and the like, which are disadvantageous in terms of reliability and durability, and without being affected by vibration of the body work.

The apparatus according to the present invention is further advantageous in that it can maintain at a high level the accuracy of estimating the vibration input from a road surface over a wide range from high frequency to low frequency, without being affected by noise and without occurrence of resonance phenomena and the like.

The present invention has thus been explained with reference to a specific embodiment shown in the drawings, by way of example, though various modifications may be made without departing from the scope of the present invention.

For example, the illustrated embodiment provides the vibration input estimating circuit 41 which includes analog circuits for computing the differential values $x_{OFL}'$ and $x_{OFR}'$ of the road surface displacement, though this is not to limit the scope of the present invention. Thus, the differential values $x_{OFL}'$ and $x_{OFR}'$ of the road surface displacements may be computed by performing high-pass filter processing and low-pass filter processing, respectively, of the stroke displacements $S_{FL}$ and $S_{FR}$ and the body work vertical accelerations $Z_{GFL}$ and $Z_{GFR}$ by means of the microprocessor unit 44.

The illustrated embodiment provides the microprocessor unit 44 which stores the differential values $x_{OFL}'$ and $x_{OFR}'$ of road surface displacements together with the delay time $\tau_R$ into a shift register area as shifting them one by one in order and computes the predict control forces $U_{PRL}$ and $U_{PRR}$ on the basis of the differential values $x_{OFL}'$ and $x_{OFR}'$ of the road surface displacements at a point of time when the delay time has come to zero, though this is not to limit the scope of the invention, either. Thus, it is also possibly to compute the predict control forces $U_{ORL}$ and $U_{PRR}$ by performing in advance a processing corresponding to the step S7 on the basis of the differential values $x_{OFL}'$ and $x_{OFR}'$ of the road surface displacements and store these control forces $U_{PRL}$ and $U_{PRR}$ together with the delay time $\tau_R$ into the shift register area as shifting them one by one in order, and compute the comprehensive control forces $U_{RL}$ and $U_{RR}$ using the foreseeing control forces $U_{PRL}$ and $U_{PRR}$ at a point of time when the delay time $\tau_R$ has come to zero.

Furthermore, the illustrated embodiment is to perform an active control of a suspension system only on the basis of the vertical acceleration, though this is not to limit the scope of the invention, either. Thus, it is also possibly to compute control signals for suppressing rolling, pitching and bouncing on the basis of accelerations detected by lateral acceleration sensors, longitudinal acceleration sensors, and the like, so as to perform a total control by adding or subtracting them to or from the said pressure instruction values $P_{FL}$ to $P_{RR}$.

The illustrated embodiment is to use the pressure control valves 20FL to 20RR as control valves, though use may be made of other flow-control-type servovalves and the like.

The illustrated embodiment provides the controller 30 which includes the microprocessor unit 44, though the controller may be composed of combination of electronic circuits such as shift registers, computing circuits and the like.

The illustrated embodiment is to use working oil as the working fluid, though any working fluid can be used provided that it is a fluid of small compressivity.

Moreover, the illustrated embodiment showed a case of using an active-type suspension system as an actuator, though any actuator may be used provided that it is composed of a suspension, such as a damping-force-variable shock absorber and the like, whose damping and spring characteristics are variable.

We claim:

1. An apparatus for estimating a vibration input to be transferred from a road surface to a suspension device of a vehicle having wheels which are supported on a vehicle body through the suspension device, comprising:

means for detecting a stroke of the suspension device;

means for detecting vertical acceleration of the vehicle body;

means for differentiating the stroke displacement detected by the stroke detecting means to compute a stroke speed;

means for integrating a vertical acceleration detected by the vehicle body vertical acceleration detecting means to compute a vertical speed of the vehicle body;

means for adding the computed stroke speed of the differentiating means and the computed vertical speed of the integrating means to each other to compute a vibration input estimated value; and means for controlling said suspension device based upon said computed vibration input estimated value.

2. The apparatus as defined in claim 1, wherein the differentiating means comprises a high-pass filter having a cutoff frequency which is set at substantially twice the spring-bottom resonance frequency.

3. The apparatus as defined in claim 1, wherein the integrating means comprises a low-pass filter having a cutoff frequency which is set at substantially one sixth of the spring-top resonance frequency.

4. The apparatus as defined in claim 1, wherein the differentiating means comprises a high-pass filter having a cutoff frequency which is set at substantially twice the spring-bottom resonance frequency, and wherein the integrating means comprises a low-pass filter having a cutoff frequency which is set at substantially one sixth of the spring-top resonance frequency.

* * * * *